United States Patent
Fowler et al.

(10) Patent No.: US 10,696,540 B2
(45) Date of Patent: Jun. 30, 2020

(54) COIL STRING STAGING AREA APPARATUS AND METHOD

(71) Applicant: DREAMWELL, LTD., Las Vegas, NV (US)

(72) Inventors: Gregory Fowler, Alpharetta, GA (US); Francis G. Jan, Atlanta, GA (US)

(73) Assignee: Dreamwell, Ltd., Doraville, GA (US)

( * ) Notice: Subject to any disclaimer, the term of this patent is extended or adjusted under 35 U.S.C. 154(b) by 807 days.

(21) Appl. No.: 15/003,957

(22) Filed: Jan. 22, 2016

(65) Prior Publication Data

US 2016/0304292 A1    Oct. 20, 2016

Related U.S. Application Data (60) Provisional application No. 62/147,887, filed on Apr. 15, 2015.

(51) Int. Cl.
| | |
|---|---|
| *B21F 33/00* | (2006.01) |
| *B68G 15/00* | (2006.01) |
| *B21F 33/04* | (2006.01) |
| *B65G 47/51* | (2006.01) |

(52) U.S. Cl.
CPC ............ *B68G 15/00* (2013.01); *B21F 33/002* (2013.01); *B21F 33/04* (2013.01); *B65G 47/5109* (2013.01)

(58) Field of Classification Search
CPC ... B68G 15/00; B65G 47/5109; B21F 33/002; B21F 33/04; A47C 27/064
See application file for complete search history.

(56) References Cited

U.S. PATENT DOCUMENTS

| | | | |
|---|---|---|---|
| 685,160 A | 10/1901 | Marshall | |
| 1,706,267 A | 3/1929 | Van De Mark et al. | |
| 1,733,660 A | 10/1929 | Gail | |
| 2,604,210 A | 7/1952 | Boone | |

(Continued)

FOREIGN PATENT DOCUMENTS

| | | | |
|---|---|---|---|
| CH | 683840 A5 | 5/1994 | |
| CN | 1316927 A | 10/2001 | |

(Continued)

OTHER PUBLICATIONS

Elektroteks, Automatic Mattress Production Line, Jan. 9, 2013, Vimeo Video, https://vimeo.com/57094698 (Year: 2013).

(Continued)

*Primary Examiner* — Lee A Holly
(74) *Attorney, Agent, or Firm* — Cantor Colburn LLP (57) ABSTRACT

A continuous coil string staging system is provided herein that includes at least one coiler configured to output at least one continuous coil string, at least one assembler configured to assemble the at least one continuous coil string into a mattress assembly, and at least one coil string staging apparatus disposed between the at least one coiler and at the least one assembler. The at least one coil string staging apparatus can have an input, a staging buffer, and an output such that the coil string staging apparatus receives the at least one continuous coil string that is output from the at least one coiler and outputs the at least one continuous coil string to the assembler such that there is a buffer of coil string available to the assembler. Various coil string staging apparatuses and methods are also provided herein.

13 Claims, 6 Drawing Sheets

(56) References Cited

U.S. PATENT DOCUMENTS

| | | | |
|---|---|---|---|
| 3,180,293 A | 4/1965 | Cash | |
| 3,279,631 A | 10/1966 | McCartney | |
| 3,689,106 A | 9/1972 | Young | |
| 3,720,329 A | 3/1973 | Gamble | |
| 3,885,691 A | 5/1975 | Knapp | |
| 3,934,740 A | 1/1976 | Rumell | |
| 4,000,870 A | 1/1977 | Davies | |
| 4,020,959 A | 5/1977 | Livesay | |
| 4,049,286 A | 9/1977 | Francis, Jr. | |
| 4,074,505 A | 2/1978 | Keren et al. | |
| 4,234,983 A | 11/1980 | Stumpf | |
| 4,234,984 A | 11/1980 | Stumpf | |
| 4,274,168 A | 6/1981 | Depowski | |
| 4,355,940 A | 10/1982 | Derickson | |
| 4,439,977 A | 4/1984 | Stumpf | |
| 4,451,946 A | 6/1984 | Stumpf | |
| 4,459,669 A | 7/1984 | Dye | |
| 4,523,344 A | 6/1985 | Stumpf | |
| 4,541,768 A | 9/1985 | Walker et al. | |
| 4,565,046 A | 1/1986 | Stumpf | |
| 4,578,834 A | 4/1986 | Stumpf | |
| 4,724,590 A | 2/1988 | Langas et al. | |
| 4,787,808 A | 11/1988 | Shimoji et al. | |
| 4,806,061 A | 2/1989 | Fenton | |
| 4,815,182 A | 3/1989 | Langas et al. | |
| 4,832,185 A | 5/1989 | Huber | |
| 4,839,933 A | 6/1989 | Plewright et al. | |
| D303,030 S | 8/1989 | Goldston | |
| 4,873,732 A | 10/1989 | Perez | |
| 4,995,162 A * | 2/1991 | Betere Cabeza | B68G 7/00 29/564.2 |
| 5,161,844 A | 11/1992 | Zimmer et al. | |
| 5,326,212 A | 7/1994 | Roberts | |
| 5,478,190 A | 12/1995 | Helton | |
| 5,495,809 A | 3/1996 | Carbo | |
| 5,579,549 A | 12/1996 | Selman et al. | |
| 5,613,287 A | 3/1997 | St. Clair | |
| 5,621,935 A | 4/1997 | St. Clair | |
| 5,704,624 A | 1/1998 | Davis | |
| 5,746,877 A | 5/1998 | Notheis et al. | |
| 5,756,022 A | 5/1998 | Siegel et al. | |
| 5,934,041 A | 8/1999 | Rudolf et al. | |
| 6,079,941 A | 6/2000 | Lee | |
| 6,101,697 A * | 8/2000 | Stumpf | B68G 9/00 29/771 |
| 6,178,723 B1 | 1/2001 | Mossbeck | |
| 6,260,331 B1 * | 7/2001 | Stumpf | B65B 9/067 53/114 |
| 6,273,257 B1 | 8/2001 | Mossbeck | |
| 6,386,560 B2 | 5/2002 | Calendar | |
| 6,817,578 B1 | 11/2004 | Garcia et al. | |
| 6,860,493 B2 | 3/2005 | Orozco | |
| 7,007,790 B2 | 3/2006 | Brannon | |
| 7,383,676 B1 | 6/2008 | Schmidt et al. | |
| 7,465,143 B1 | 12/2008 | Adams | |
| 7,731,206 B2 | 6/2010 | Borrmann | |
| 7,731,207 B2 | 6/2010 | Santos Gómez | |
| 8,042,829 B2 | 10/2011 | Hailston et al. | |
| 8,104,807 B2 | 1/2012 | Maffeis | |
| 8,596,611 B1 | 12/2013 | Fountain | |
| 8,851,488 B2 | 10/2014 | Carruyo | |
| 8,979,099 B1 | 3/2015 | Ellis | |
| 9,192,266 B2 | 11/2015 | Starr et al. | |
| D744,713 S | 12/2015 | Della Polla | |
| 9,216,752 B1 | 12/2015 | Carruyo | |
| 2003/0149608 A1 | 8/2003 | Kall et al. | |
| 2003/0209827 A1 | 11/2003 | Levera et al. | |
| 2004/0061267 A1 | 4/2004 | Brown | |
| 2004/0224086 A1 | 11/2004 | Wright | |
| 2004/0227086 A1 | 11/2004 | Haug et al. | |
| 2004/0254825 A1 | 12/2004 | Hsu et al. | |
| 2004/0261186 A1 | 12/2004 | Gladney | |
| 2005/0161363 A1 | 7/2005 | Kowalski et al. | |
| 2005/0256776 A1 | 11/2005 | Bayoumi et al. | |
| 2005/0257883 A1 | 11/2005 | Anagnostopoulos | |
| 2007/0214625 A1 | 9/2007 | Brown et al. | |
| 2008/0012260 A1 | 1/2008 | Ouyang et al. | |
| 2008/0149030 A1 | 6/2008 | Klein | |
| 2010/0071136 A1 | 3/2010 | Weber | |
| 2010/0072676 A1 | 3/2010 | Gladney et al. | |
| 2010/0281666 A1 | 11/2010 | Tseng | |
| 2011/0253770 A1 | 10/2011 | Resta et al. | |
| 2011/0282476 A1 | 11/2011 | Hegemier et al. | |
| 2012/0091688 A1 | 4/2012 | Fink | |
| 2015/0183567 A1 | 7/2015 | Tevault et al. | |
| 2015/0203221 A1 | 7/2015 | Van De Dey et al. | |

FOREIGN PATENT DOCUMENTS

| | | |
|---|---|---|
| CN | 1473228 A | 2/2004 |
| CN | 1618603 A | 5/2005 |
| CN | 102215720 A | 10/2011 |
| CN | 102281798 A | 12/2011 |
| CN | 102472977 A | 5/2012 |
| CN | 103072261 A | 5/2013 |
| CN | 103231619 A | 8/2013 |
| CN | 103240868 A | 8/2013 |
| DE | 2856600 A1 | 7/1980 |
| DE | 3540233 A1 | 11/1985 |
| DE | 4307142 C1 | 5/1994 |
| DE | 102008019234 A1 | 11/2008 |
| DE | 202012100849 U1 | 5/2012 |
| DE | 102011083451 A1 | 3/2013 |
| EP | 1403014 A1 | 3/2004 |
| EP | 2316783 A1 | 10/2009 |
| EP | 2147775 A2 | 1/2010 |
| EP | 3247670 B1 | 11/2018 |
| JP | S59162056 U | 10/1984 |
| JP | 2005333827 A | 12/2008 |
| WO | 1996027553 A1 | 12/1996 |
| WO | 2005065493 A1 | 7/2005 |
| WO | 2009103173 A1 | 8/2009 |
| WO | 2013041894 A1 | 3/2013 |
| WO | 2016118831 A1 | 7/2016 |

OTHER PUBLICATIONS

Elektroteks, Fullpack, Jan. 9, 2013, Vimeo Video, https:11vimeo.com/57096497 (2013).

Notification Concerning Transmittal of International Preliminary Report on Patentability (Chaper I of the Patent Cooperation treaty), issued in International Appliation No. PCT/US2016/014473, dated Aug. 3, 2017; 8 pages.

Notification Concerning Transmittal of International Preliminary Report on Patentability (Chaper I of the Patent Cooperation treaty), issued in International Appliation No. PCT/US2016/014474, dated Aug. 3, 2017; 8 pages.

Notification Concerning Transmittal of International Preliminary Report on Patentability (Chaper I of the Patent Cooperation treaty), issued in International Appliation No. PCT/US2016/014476, dated Aug. 3, 2017; 7 pages.

Notification Concerning Transmittal of International Preliminary Report on Patentability (Chaper I of the Patent Cooperation treaty), issued in International Appliation No. PCT/US2016/014480, dated Jul. 25, 2017; 8 pages.

Notification Concerning Transmittal of International Preliminary Report on Patentability (Chaper I of the Patent Cooperation treaty), issued in International Appliation No. PCT/US2016/014482, dated Aug. 3, 2017; 8 pages.

Notification Concerning Transmittal of International Preliminary Report on Patentability (Chaper I of the Patent Cooperation treaty), issued in International Appliation No. PCT/US2016/014525, dated Aug. 3, 2017; 9 pages.

Notification Concerning Transmittal of International Preliminary Report on Patentability (Chaper I of the Patent Cooperation treaty), issued in International Appliation No. PCT/US2016/014576, dated Aug. 3, 2017; 7 pages.

Translation of CH 683840 A5, Antonio Betere Cabeza, published May 31, 1994.

(56) References Cited

OTHER PUBLICATIONS

Translation of DE 3540233 A1, Josef Rosier, published May 14, 1985.
Goldman R.P., et al: "A Constraint-Based Scheduler for Batch Manufacturing," IEEE Expert, IEEE Service Center, New York, NY, US. vol. 12, No. 1: Jan. 1, 1997, pp. 49-56, XP000689724.
Notification of Transmittal of The International Search Report and The Written Opinion of the International Searching Authority, or the Declaration, issued in International Application No. PCT/US2016/014473, dated Apr. 4, 2016; 5 pages.
Notification of Transmittal of The International Search Report and The Written Opinion of The International Searching Authority, or The Declaration, issued in International Application No. PCT/US2016/014474, dated Apr. 19, 2016; 6 pages.
Notification of Transmittal of The International Search Report and The Written Opinion of the International Searching Authority, or the Declaration, issued in International Application No. PCT/US2016/014476, dated Apr. 4, 2016; 10 pages.
Notification of Transmittal of The International Search Report and The Written Opinion of The International Searching Authority, or The Declaration, issued in International Application No. PCT/US2016/014482, dated Apr. 20, 2016; 6 pages.
Notification of Transmittal of The International Search Report and The Written Opinion of The International Searching Authority, or The Declaration, issued in International Application No. PCT/US2016/014525, dated Apr. 8, 2016; 11 pages.
Notification of Transmittal of The International Search Report and The Written Opinion of the International Searching Authority, or the Declaration, issued in International Application No. PCT/US2016/014576, dated Apr. 25, 2016; 4 pages.
Written Opinion of the International Searching Authority, issued in International Application No. PCT/US2016/014473, dated Apr. 4, 2016; 6 pages.
Written Opinion of the International Searching Authority, issued in International Application No. PCT/US2016/014474, dated Apr. 19, 2016; 6 pages.
Written Opinion of the International Searching Authority, issued in International Application No. PCT/US2016/014476, dated Apr. 4, 2016; 10 pages.
Written Opinion of the International Searching Authority, issued in International Application No. PCT/US2016/014482, dated Apr. 20, 2016; 6 pages.
Written Opinion of the International Searching Authority, issued in International Application No. PCT/US2016/014576, dated Apr. 25, 2016; 6 pages.
Notification of Transmittal of The International Search Report and the Written Opinion of the International Searching Authority, or the Declaration, issued in International Application No. PCT/US2016/014480, dated Jun. 21, 2016; 5 pages.
Written Opinion of the International Searching Authority, issued in International Application No. PCT/US2016/014480, dated Jun. 21, 2016; 6 pages.

* cited by examiner

COIL STRING STAGING AREA APPARATUS AND METHOD

CROSS-REFERENCE TO RELATED APPLICATIONS

This application is a NON-PROVISIONAL of and claims the benefit of U.S. Application No. 62/147,887, filed Apr. 15, 2015, which is incorporated herein by reference in its entirety.

BACKGROUND

The present disclosure generally relates to strings of pocketed coils, and more particularly, to an apparatus and method of staging coil strings prior to assembly into a mattress assembly.

Assemblies of pocketed coil springs are employed in a variety of settings, including innerspring assemblies for mattresses and other bedding and furniture applications. In some applications, such innerspring constructions can include a plurality of rows of pocketed coil springs connected to each other. Typically, a row of pocketed coil springs—also called a string—is formed by a coiling apparatus (i.e., coiler), which often forms a plurality of individual coil springs and then places the coil springs between plies of fabric that are then welded around the coil to form pockets that house the coil springs.

Furthermore, pocketed coil springs are often formed in a continuous string by the coiling apparatus. That is, the pocketed coil strings are not cut to the length needed for an individual mattress application, but rather is formed in one long coil string. In these examples, an assembler can receive the continuous pocketed coil string and cut the pocketed coil string to the appropriate length based on any desired mattress specifications. Typically, the assembler can further apply an adhesive to the coil string and adhere the individual rows of pocketed coil strings together to form a plurality of rows of pocketed coil strings that forms the desired mattress or other application.

As mentioned, assemblers are typically placed downstream of a coiler and are configured to receive the pocketed coil string being outputted from the coiler. In many applications, however, the assembler and the coiler are separately controlled apparatuses that can operate at different rates. Due to many factors—such as differences in coiler speeds, jamming issues, changing over raw materials such as fabric or wire, routine maintenance, and/or operator error—the assembler can often be left waiting for a pocketed coil string resulting in manufacturing down-time.

Accordingly, there remains a need for an improved coil string staging area apparatus and method that can increase the speed and efficiency of forming rows of pocketed coil springs.

SUMMARY

A continuous coil string staging system is provided that includes at least one coiler configured to output at least one continuous coil string, at least one assembler configured to assemble the at least one continuous coil string into a mattress assembly, and at least one coil string staging apparatus disposed between the at least one coiler and at the least one assembler. The at least one coil string staging apparatus can have an input, a staging buffer, and an output such that the coil string staging apparatus receives the at least one continuous coil string that is output from the at least one coiler and outputs the at least one continuous coil string to the assembler such that there is a buffer of coil string available to the assembler.

Also provided herein is a coil string staging apparatus having an input configured to receive a continuous coil string, a staging buffer configured to store at least a portion of the continuous coil string such that the staging buffer has a buffer capacity, and an output coupled to the staging buffer such that the continuous coil string stored in the staging buffer is configured to selectively discharge the continuous coil string.

Additionally, a method of staging coil strings for assembly into a mattress is provided that includes receiving a continuous coil string configured to be cut into a plurality of coil strings, staging the continuous coil string in a buffer such that the coil string is stored in a manner that allows the continuous coil string to remain untangled, and outputting the continuous coil string from the buffer such that the continuous coil string is output without interruption and without tangling. In some aspects, staging the continuous coil string in a buffer can further include maintaining a buffer of a portion of the coil string such that there is at least enough coil string in the buffer to assemble at least one mattress.

The above described and other features are exemplified by the accompanying drawings and detailed description.

BRIEF DESCRIPTION OF THE SEVERAL VIEWS OF THE DRAWINGS

This disclosure will be more fully understood from the following detailed description taken in conjunction with the accompanying drawings, in which.

DETAILED DESCRIPTION

Certain exemplary aspects will now be described to provide an overall understanding of the principles of the structure, function, manufacture, and use of the devices, systems, methods, and/or kits disclosed herein. One or more examples of these aspects are illustrated in the accompanying drawings. Those skilled in the art will understand that the devices, systems, methods, and/or kits disclosed herein and illustrated in the accompanying drawings are non-limiting and exemplary in nature and that the scope of the present invention is defined solely by the claims. The features illustrated or described in connection with any one aspect described may be combined with the features of other aspects. Such modification and variations are intended to be included within the scope of the present disclosure.

Further in the present disclosure, like-numbered components generally have similar features, and thus each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can be determined for any geometric shape. Sizes and shapes of the systems and devices, and the components thereof, can depend at least on the size and shape of the components with which the systems and devices will be used, and the methods and procedures in which the systems and devices will be used.

To produce mattress and other furniture assemblies that utilize a plurality of rows of coil springs—such as an innerspring mattress assembly—a coil string staging apparatus can be utilized to provide a buffer of continuous coil string such that manufacturing down-time is reduced. Specifically, a coil string staging apparatus can be disposed between a coiler and an assembler such that the coil string staging apparatus receives a continuous coil string that is produced by the coiler prior to the continuous coil string being sent to the assembler. In such aspects, the continuous coil string staging apparatus can have a buffer capacity of a portion of the continuous coil string such that there is always continuous coil string available to the assembler.

"Continuous coil string" as used herein means that a string of coils is substantially unbroken. That is, the coil string is not yet cut to a length needed for a particular mattress assembly. Typically, a continuous coil string will be cut to the appropriate length by an assembler during assembly.

FIGS. 1-4 illustrate a coil string staging apparatus 100. As shown, the coil string staging apparatus 100 can include an input 102, a staging buffer 104, and an output 106. The input 102 is configured to receive a continuous coil string 108. As shown, in some aspects the staging buffer 104 can store at least a portion of the continuous coil string 108. Still further, the output can be configured to output—or discharge—the portion of the continuous coil string 108 that is stored in the staging buffer 104.

Figure 1:
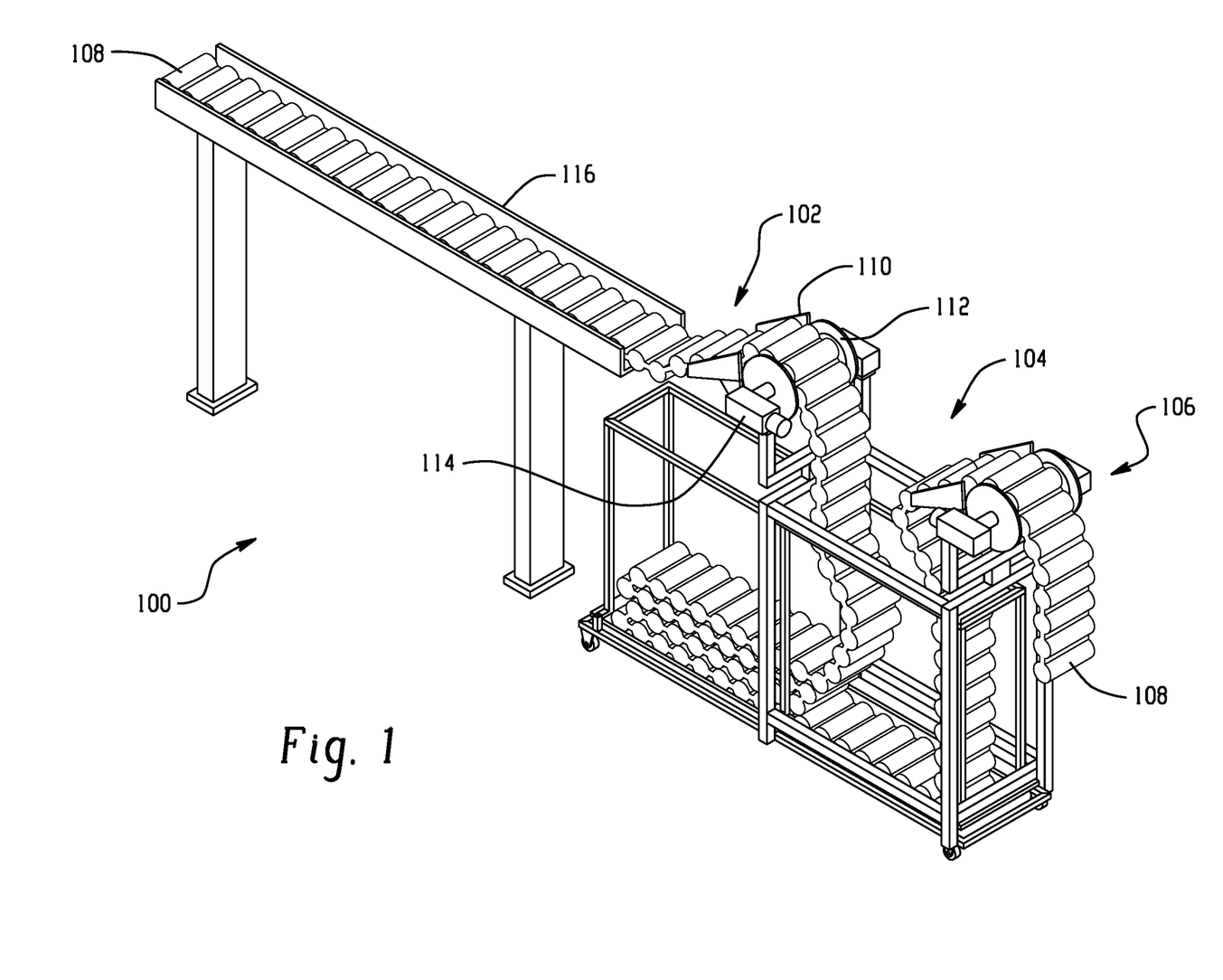
FIG. 1 is a perspective view of a continuous coil string staging apparatus.
Figure 2:
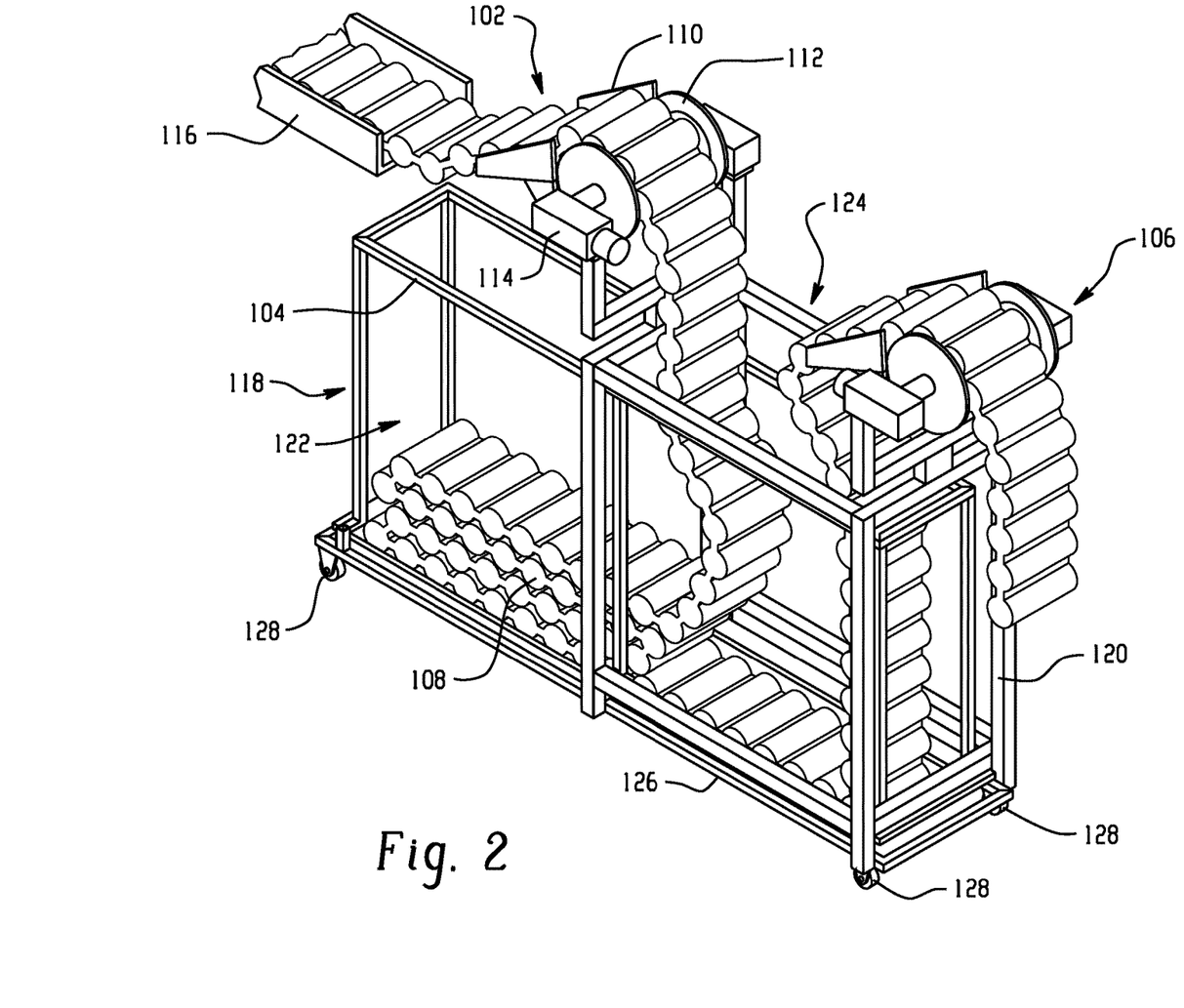
FIG. 2 is a perspective view of the continuous coil staging apparatus of FIG. 1.
Figure 3:
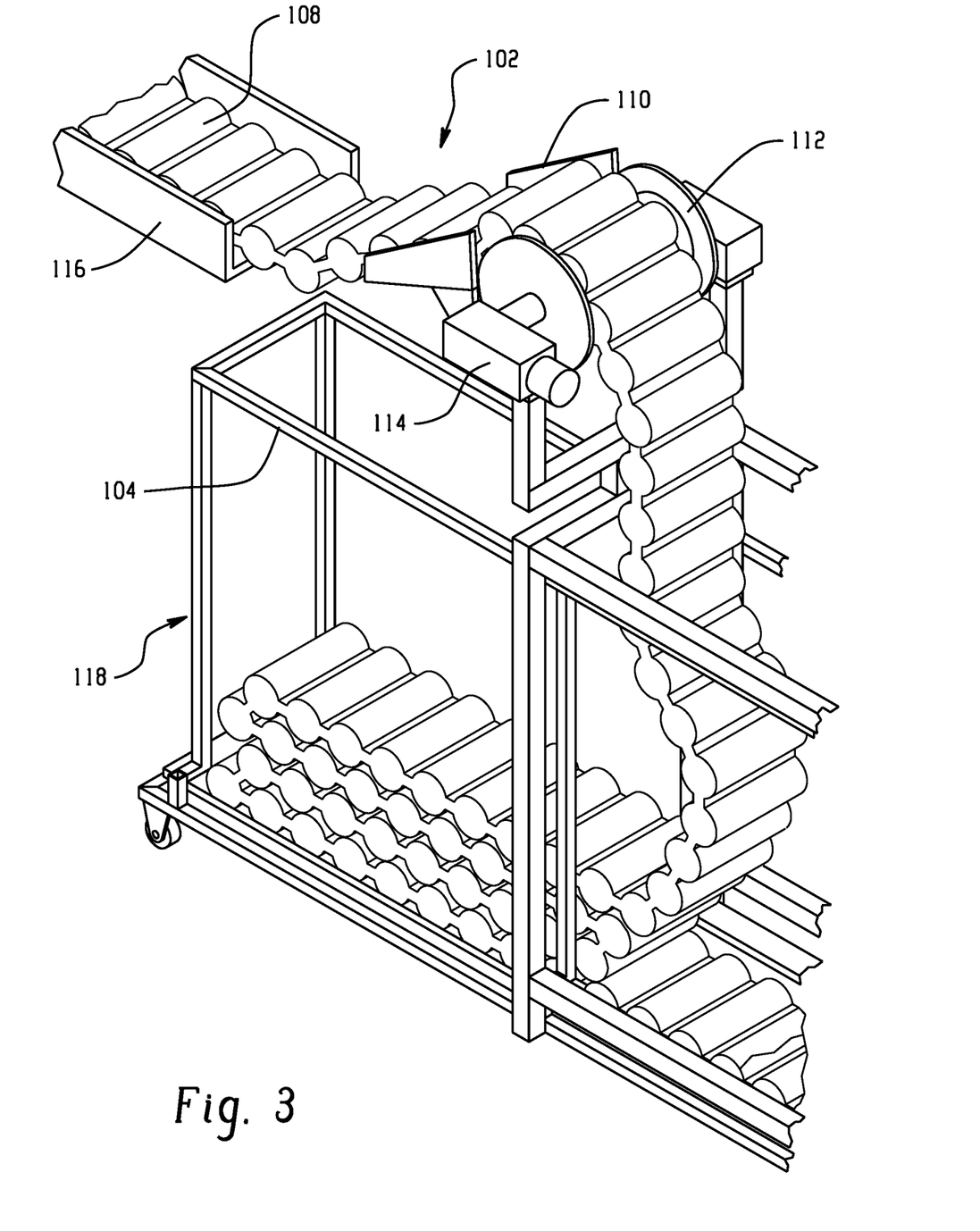
FIG. 3 is a perspective view of the input mechanism of the continuous coil staging apparatus of FIG. 1.

FIGS. 1-3 illustrate, among other things, an example of an input 102 for use with the coil staging apparatus 100. As shown, for example, in FIG. 3, the input 102 can include a receiving mouth 110 that is configured to receive the coil string 108. Specifically the mouth 110 can be appropriately dimensioned to allow the string 108 to pass therethrough. The input 102 can also include a conveyor 112 or conveyor system that is configured to move the string 108 through the input 102. In some aspects, the conveyor 112 includes a motor 114 that is configured to drive the conveyor 112 and thus actively move the coil string through the input. The conveyor 112 can be any conveyor or conveyor system that is capable of moving the string 108 into the staging buffer 104. For example, the conveyor 112 can be any of a wheel, star wheel, belt conveyor, or roller conveyer. In some aspects, the input 102 can be disposed above the staging buffer 104 such that as the string 108 is moved through the input 102 it falls into the staging buffer 104. Additionally and without limitation, the input 102 can be directly coupled to a support on or adjacent to an end of the staging buffer 104. As shown in FIGS. 1-3, the input 102 can also include a guide 116 configured to guide the coil string 108 to the conveyor 112 and through the input 102.

A staging buffer 104 for use in a coil string staging apparatus is also illustrated in FIGS. 1-4. In some aspects, the staging buffer 104 is configured to store a buffer of continuous coil string. As such, the staging buffer 104 can be of any shape that is suitable for storing coil strings such as portions of the continuous coil string 108. For example and without limitation, the staging buffer 104 as shown in FIGS. 1-3, can be generally rectangular in shape. In other aspects, the staging buffer can be square, triangular, round, cylindrical, octagonal, or any other shape.

As shown in FIG. 2, a staging buffer 104 can have a proximal input end 118, a distal output end 120, a first side wall 122, a second side wall 124, and a floor 126 disposed therebetween. The proximal distal end 118 can be configured to support an input 102—either by having the input 102 disposed an adjacent distance from the proximal end as shown in FIG. 2, or by having the input 102 disposed directly over the end 118 (not shown). The distal output end 120 can be configured to support an output 106 either by having the output 106 disposed an adjacent distance from the distal end 120, or by having the output 106 disposed directly over the end 120 as shown in FIG. 2. First and second side walls 122, 124 can span between the proximal end 118 and the distal end 120. The floor 126 also spans between the proximal and distal ends 118, 120, as well as the first and second side walls 122, 124. Optionally, in some aspects, the staging buffer 104 can include casters 128 such that the staging buffer can be easily maneuvered.

In some aspects, the staging buffer can be at least partially transparent such that any coil string stored within the staging buffer is visible through at least a portion of the staging buffer. For example, as shown in FIGS. 1-4, the first side wall 122, the second side wall 124, the proximal end 118, and/or the distal end 120 can be formed of transparent material such as glass, plastics, polymethyl methacrylate (Plexiglass™), perforated plastic or metal sheeting, plastic or wire meshes, hardware cloths, or any other material that allows the coils to be seen when stored in the staging buffer. In some aspects, only a portion of the staging buffer can be transparent as described. For example, the first side wall 122 can optionally include a window (not shown) formed of transparent material.

As shown in FIGS. 1-4, the staging buffer 104 can be dimensioned and configured to store any length of coil string. For example, the staging buffer can have a width (such as is defined by a width of the floor 126) that is greater than a width of the continuous coil string. That is, the distance between the first side wall 122 and second side wall 124 is greater than the width of the coil string. The width can be sufficient to store only a single coil string, or optionally, multiple rows of coil string. In some aspects, the staging buffer 104 can be configured to store any buffer amount of coil string that is desired. For example, the staging buffer 104 can be configured to store at least enough continuous coil string 108 to form one entire mattress assembly. Alternatively, the staging buffer 104 can be configured to store less than one mattress assembly worth of coil string, such as half of a mattress assembly, one row of a plurality of rows that form a mattress assembly, or any other amount sufficient to maintain mattress assembly production goals. For example and without limitation, if a mattress assembly requires ten (10) rows of coil strings that are each ten (10) feet in length, then the length of continuous coil string required to produce one mattress assembly is about one hundred (100) feet. Thus, in that example, the staging buffer 104 can be configured to store at least about one hundred (100) feet of continuous coil string 108. Additionally, the staging buffer, in some aspects, can be dimensioned such that the coil string, when input into the staging buffer, remains untangled and neatly stacked such that the continuous coil string can easily pay out (i.e., discharge) from the staging buffer.

Figure 4:
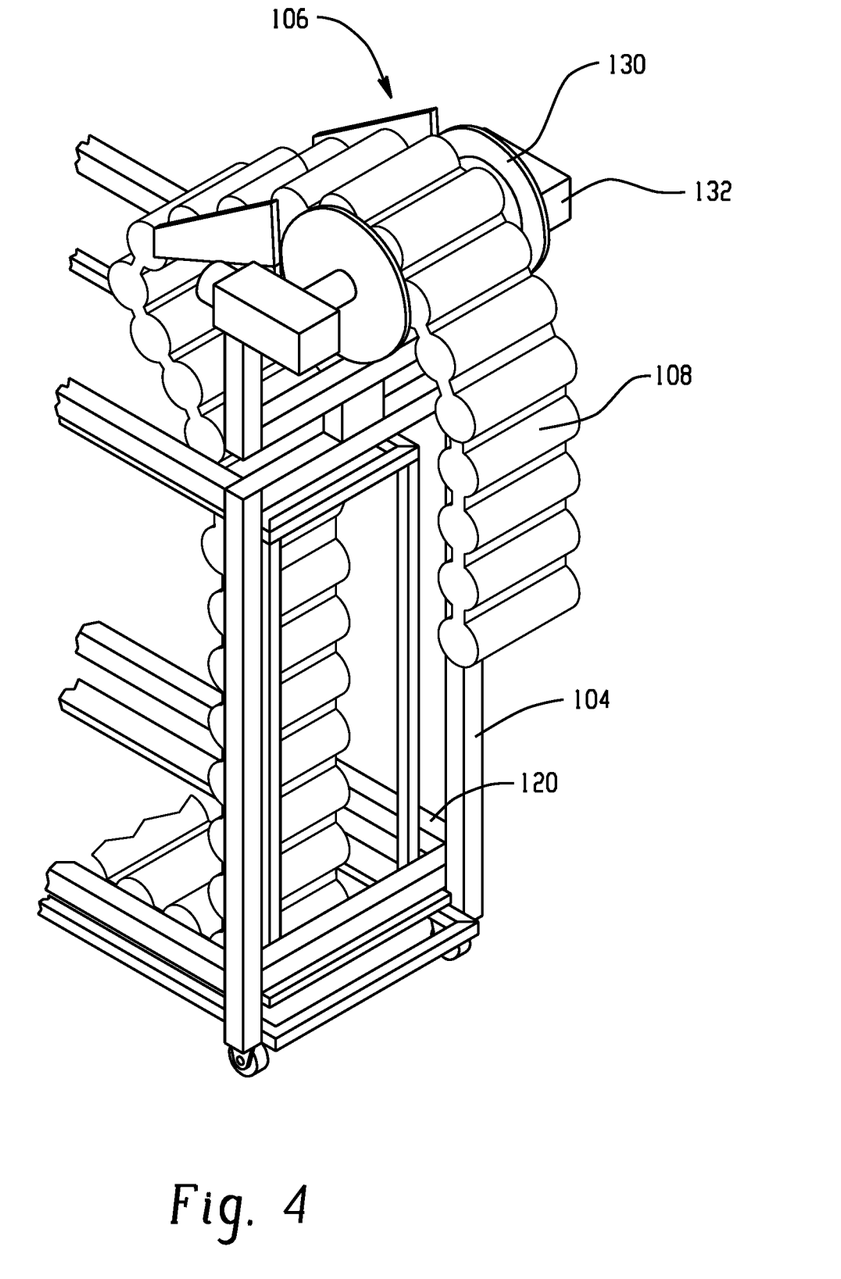
FIG. 4 is a perspective view of the output mechanism of the continuous coil staging apparatus of FIG. 1.

FIG. 4 illustrates an example of an output 106 coupled to a distal end of a staging buffer 104. As shown, the output 106 is configured to receive the continuous coil string 108 from the staging buffer 104. The output 106 can be appropriately dimensioned to allow the string 108 to pass therethrough. The output 106 can be configured to either actively output or passively output the continuous coil string. "Actively output" as used herein means that the output conveyor is driven such that the output conveyor directly pulls the coil string from the staging apparatus. For example, actively outputting a coil string can include using an output conveyor that is driven by a motor such that the coil string is pulled from the buffer. "Passively output" as used herein means that the output conveyor is not driven such that the output conveyor guides the coil string from the staging apparatus when the string is pulled out of the staging apparatus by a downstream process, such as the assembler.

For example, the output 106 can include a conveyor 130 or conveyor system that is configured to move the string 108 through the output 106. In some aspects, the conveyor includes a motor 132 that is configured to drive the conveyor 130 and thus actively move the coil string 108 through the output. The conveyor 130 can be any conveyor or conveyor system that is capable of moving the string 108 into the staging buffer 104. For example, the conveyor 130 can be any of a wheel, star wheel, belt conveyor, and/or roller conveyer. In some aspects, the output 106 can be disposed above the staging buffer 104. Alternatively, the output 106 can be disposed in any location that is suitable to actively or passively output the coil string. Additionally, the output 106 can be directly coupled to a distal end of the staging buffer 104, as shown in FIG. 4. The output can also include a guide (not shown) configured to guide the coil string 108 downstream.

Figure 5:
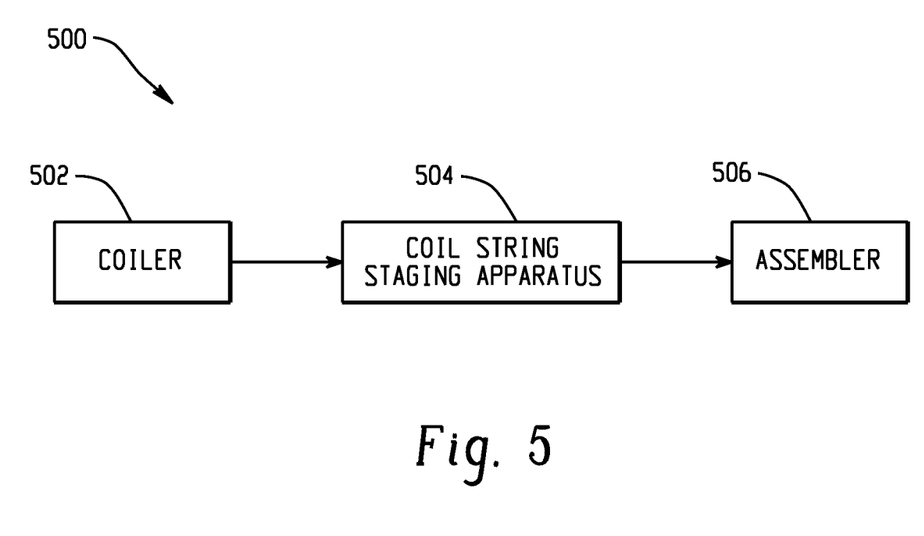
FIG. 5 is a schematic diagram of a continuous coil string staging system.

In use, as shown in FIG. 5, a continuous coil string staging system 500 can include a coiler 502, a coil string staging apparatus 504, and an assembler 506. The coiler 502 can be any coiler suitable for producing pocketed coil springs—specifically, a coiler that produces a continuous string of pocketed coil strings. For example, coiling apparatuses, i.e., coilers, are shown without limitation, in U.S. Pat. Nos. 4,565,046; 1,733,660; and 5,613,287, which are incorporated herein by reference in their entirety.

The staging apparatus can be placed or disposed downstream of the coiler 502, for example between the coiler 502 and an assembler 506. In so doing, the coil string staging apparatus 504 receives a continuous coil string from the coiler 502. Once received, the coil string staging apparatus 504 can store portions of the continuous string in a buffer capacity. As described above, the coil string staging apparatus 504 buffer capacity can be equal to an amount of coil string that is sufficient to produce about one mattress assembly. Further, the coil string staging apparatus 502 outputs or discharges the stored coil string to the downstream assembler 506.

In some aspects, the assembler 506 can be configured to assemble the at least one coil string into a mattress assembly. Assemblers can be configured in a variety of manners that are sufficient to produce mattress assemblies. By way of example and without limitation, assemblers are described in U.S. Pat. No. 5,746,877, which is incorporated herein by reference in its entirety. Assembly can include—without limitation—receiving a continuous coil string from the staging apparatus 504, cutting the continuous coil string into a plurality of rows of coil strings, and applying an adhesive to said rows and adhering the rows to one another to form a spring assembly, such as is used in an innerspring mattress assembly. In some aspects, the assembler 506 is configured to receive the continuous coil string from the staging apparatus 504 using an actively powered conveyor that is disposed on the assembler, such as a star wheel. In such aspects, the staging apparatus 504 can optionally be configured to passively output the coil string to the assembler 506.

Figure 6:
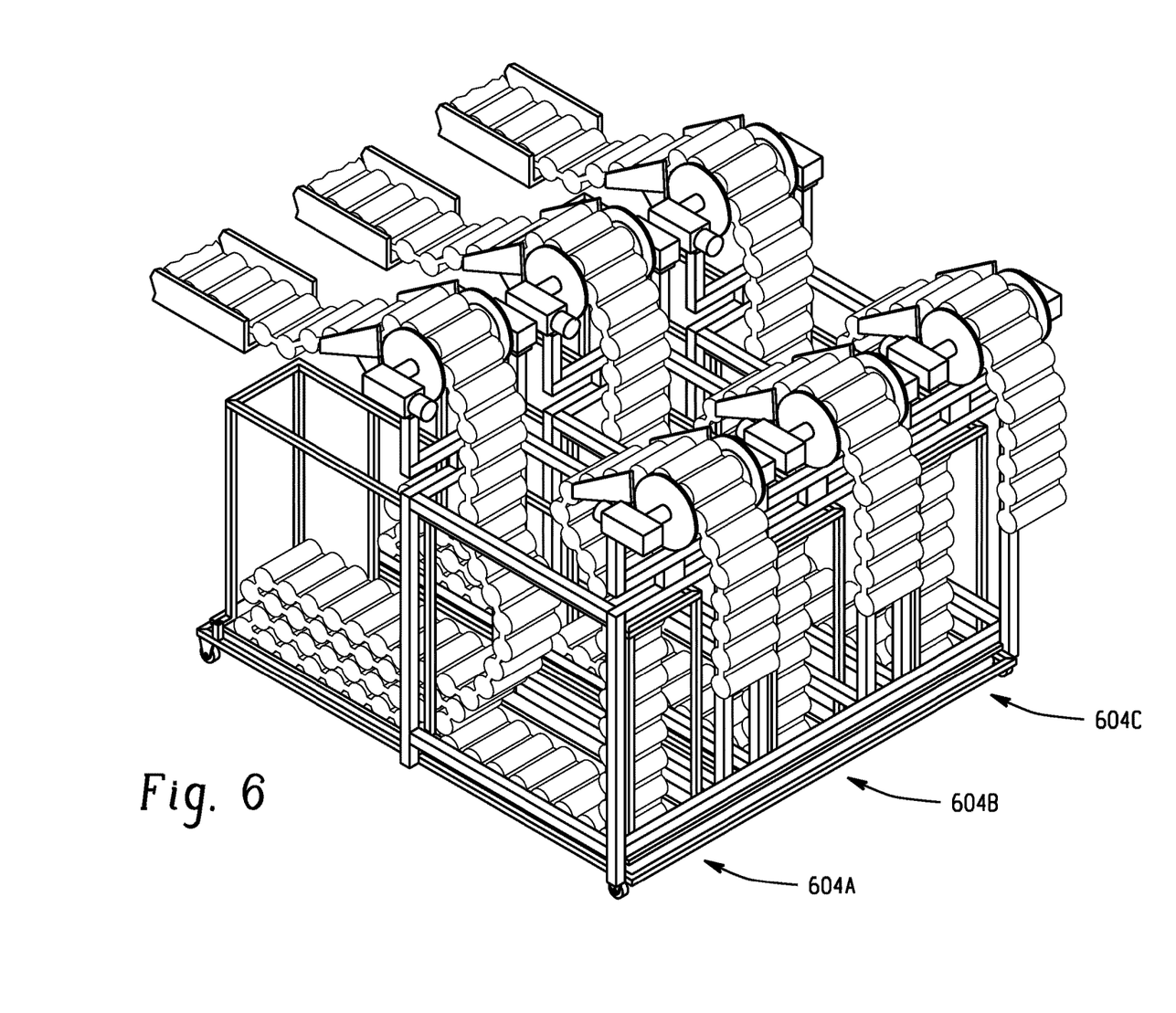
FIG. 6 is a perspective view of a plurality of continuous coil staging apparatuses.

Furthermore, in use, continuous coil string staging systems can include a plurality of coilers, staging apparatuses, and/or assemblers. In some aspects, the system can have one staging apparatus for every one coiler. For example, as shown in FIG. 6, three staging apparatuses 604A, 604B, and 604C can be used to feed a single assembler. As such, coil string staging systems can include at least one coiler, at least one staging apparatus, and/or at least one assembler.

In some aspects, including but not limited to those having more than one coiler, staging apparatus, or assembler, each portion of the system can be selectively and/or independently controlled such that desired outputs are achieved. The system can include a variety of sensors configured to monitor various system parameters, including but not limited to the rate and amount of continuous coil string produced by a coiler, the amount of coil string in the staging buffer, the rate that continuous coil string is input to the staging buffer, the rate that continuous coil string is output from the staging buffer, and/or the amount and rate of assembly. For example, the at least one staging apparatus can have an input and an output that are controlled so as to regulate the amount of coil string stored in the staging apparatus and to maximize the amount of mattress assemblies produced. For example, if the coiler stops producing coil string (such as, when performing a wire or fabric changeover), the input to the staging apparatus can be stopped while continuing to operate the output, thus depleting the buffer of coil strings and maintaining operation of the assembler throughout the coiler stoppage.

With respect to the above description, it is to be realized that the optimum composition for the parts of the invention, to include variations in components, materials, size, shape, form, function, and manner of operation, assembly and use, are deemed readily apparent to one skilled in the art, and all equivalent relationships to those illustrated in the examples and described in the specification are intended to be encompassed by the present invention. Therefore, the foregoing is considered as illustrative only of the principles of the invention. Further, various modifications may be made of the invention without departing from the scope thereof, and it is desired, therefore, that only such limitations shall be placed thereon as are set forth in the appended claims.

What is claimed is:

1. A continuous coil string staging system, comprising:
at least one coiler configured to output at least one continuous coil string;
at least one assembler configured to assemble the at least one continuous coil string into a mattress assembly; and
at least one coil string staging apparatus disposed between the at least one coiler and at the least one assembler, the at least one coil string staging apparatus comprising an input configured to receive the at least one continuous coil string including a mouth to receive the at least one continuous coil string and a conveyor; and a staging buffer configured to store at least a portion of the at least one continuous coil string such that the staging buffer has a buffer capacity, wherein the staging buffer comprises a proximal input end supporting the input, a distal output end supporting an output, a first side wall, a second side wall, and a floor disposed therebetween, wherein the input and the output are disposed above the staging buffer, wherein multiple rows of the continuous coil string are arranged on the floor between the first and second walls within the staging buffer to define the buffer capacity.

2. The system of claim 1, wherein the input comprises at least one conveyor configured to transfer the continuous coil string from the at least one coiler to the at least one coil string staging apparatus.

3. The system of claim 1, wherein the output comprises at least one conveyor configured to actively output the continuous coil string from the coil string staging apparatus to the assembler.

4. The system of claim 1, wherein the output comprises at least one conveyor configured to passively output the continuous coil string from the coil string staging apparatus to the assembler.

5. The system of claim 1, wherein a distance between the first side wall and second side wall is greater than a width of the continuous coil string.

6. The system of claim 1, wherein the buffer of coil string available to the assembler is greater than or equal to an amount of continuous coil string sufficient to produce at least one mattress assembly.

7. The system of claim 1, wherein the system has one staging apparatus for every one coiler.

8. A coil string staging apparatus, comprising:
   an input configured to receive a continuous coil string including a mouth to receive the continuous coil string and a conveyor;
   a staging buffer configured to store at least a portion of the continuous coil string such that the staging buffer has a buffer capacity, wherein the staging buffer comprises a proximal input end supporting the input, a distal output end, a first side wall, a second side wall, and a floor disposed therebetween, wherein multiple rows of the continuous coil string are stackedly arranged on the floor between the first and second walls within the staging buffer to define the buffer capacity; and
   an output configured to discharge the continuous coil string through the distal output end of the staging buffer to the assembler, wherein the input and the output are disposed above the staging buffer.

9. The apparatus of claim 8, wherein the input is configured to receive the continuous string directly from a coiler.

10. The apparatus of claim 8, wherein the output is configured to output the continuous string to an assembler.

11. The apparatus of claim 8, wherein the input comprises a conveyor.

12. The apparatus of claim 8, wherein the output comprises at least one conveyor configured to actively output the continuous coil string from the coil string staging apparatus to an assembler.

13. The apparatus of claim 8, wherein the staging buffer comprises at least one transparent side such that the stored portion of the continuous coil string is visible.

* * * * *